(12) United States Patent
Li

(10) Patent No.: US 10,366,223 B2
(45) Date of Patent: Jul. 30, 2019

(54) METHODS AND APPARATUS FOR RESTRICTING BATCH REQUESTS FOR SERVICE

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventor: Weiqi Li, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 0 days.

(21) Appl. No.: 15/563,034

(22) PCT Filed: Jan. 27, 2016

(86) PCT No.: PCT/CN2016/072359
§ 371 (c)(1),
(2) Date: Sep. 29, 2017

(87) PCT Pub. No.: WO2016/155411
PCT Pub. Date: Oct. 6, 2016

(65) Prior Publication Data
US 2018/0349591 A1    Dec. 6, 2018

(30) Foreign Application Priority Data
Mar. 31, 2015    (CN) .......................... 2015 1 0148230

(51) Int. Cl.
*G06F 21/36*    (2013.01)
*G06F 21/31*    (2013.01)
(Continued)

(52) U.S. Cl.
CPC ............ *G06F 21/36* (2013.01); *G06F 9/5011* (2013.01); *G06F 21/31* (2013.01); *H04L 67/16* (2013.01);
(Continued)

(58) Field of Classification Search
CPC ....................................... G06F 21/36
See application file for complete search history.

(56) References Cited

U.S. PATENT DOCUMENTS

| 8,370,926 | B1 | 2/2013 | Satish | |
|---|---|---|---|---|
| 2010/0281189 | A1* | 11/2010 | Yu | G06F 13/385 710/29 |
| 2016/0182481 | A1* | 6/2016 | Audsin | H04L 63/08 726/6 |

FOREIGN PATENT DOCUMENTS

| CN | 103455965 A | 12/2013 |
|---|---|---|
| CN | 104253687 A | 12/2014 |

(Continued)

OTHER PUBLICATIONS

International Search Report with English translation and Written Opinion for Application No. PCT/CN2016/072359 dated May 4, 2016 (10 pages).

*Primary Examiner* — Josnel Jeudy
(74) *Attorney, Agent, or Firm* — Michael Best & Friedrich LLP

(57) ABSTRACT

The present invention provides a method and apparatus for restricting batch requests for a service, facilitating restriction on requesting the service in batch and contributing to overcome some deficiencies in the prior art. The method comprises: receiving, by a server, service request information sent by a terminal (S11); sending, by the server, a calculation problem to the terminal, the question requiring a larger amount of computing recourses of the terminal than that of the server (S12); receiving, by the server, a calcula-
(Continued)

tion result of the calculation question from the terminal (S13), and verifying the calculation result (S14), and if the calculation result is correct, providing the service to the terminal (S15), otherwise, rejecting to provide the service to the terminal (S16).

5 Claims, 1 Drawing Sheet

(51) Int. Cl.
      *H04L 29/08*       (2006.01)
      *G06F 9/50*        (2006.01)
      *H04L 29/06*       (2006.01)

(52) U.S. Cl.
      CPC ...... *H04L 67/32* (2013.01); *G06F 2221/2103* (2013.01); *G06F 2221/2133* (2013.01); *H04L 67/02* (2013.01); *H04L 67/42* (2013.01)

(56) References Cited

FOREIGN PATENT DOCUMENTS

| | | |
|---|---|---|
| CN | 104899482 A | 9/2015 |
| GB | 2505407 A | 3/2014 |

\* cited by examiner

METHODS AND APPARATUS FOR RESTRICTING BATCH REQUESTS FOR SERVICE

CROSS-REFERENCE TO RELATED APPLICATIONS

This application is a national stage filing under 35 U.S.C. 371 of International Application No. PCT/CN2016/072359 filed Jan. 27, 2016, which claims the foreign priority benefit of Chinese Patent Application No. 201510148230.7 filed Mar. 31, 2015, which are incorporated by reference herein in their entireties.

TECHNICAL FIELD

The present invention relates to the field of a computer technology and, more particularly, to a method and apparatus for restricting batch requests for service.

BACKGROUND

A service provider has benefits from strong business support capabilities provided by the Internet, while faces harsh malicious attacks from the public network. A large class of attacks among the attacks access services through rapid and repetitive executions using batch programs, such as batch registration, batch posting, brush ranking, spiking, and copying websites with a crawler, thereby impersonating a batch of users' behaviors with these batch operations. Taking batch registration programs as an example, if service providers do not implement restrictions, a batch registration program can register thousands of counterfeit users in one hour by parallel execution in a personal computer. These counterfeit users can be further used to obtain illegal gains.

Requests for these batch operations consume a lot of computing resources of service providers, however introduce inefficient flow, reduced service performance, and impacted access from normal users. In order to ensure proper operation of services, service providers need to consider how to restrict such kinds of batch operations (often referred to as "anti-brush"), such that service resources can serve normal users.

Currently, general solutions for restricting batch operations (anti-brush) include the following methods:

1. Restrictions at a network layer: implementing policy control on a request frequency at a network layer, e.g.

(1) Determine specific restrictions according to access conditions for IP addresses and ports, such as a number of accesses allowed per unit time;

(2) Determine rules and policies according to a HTTP header, such as restricting a number of IP addresses from which URL is accessed per unit time and evaluating for information such as Cookie.

(3) Change settings of a browser terminal to block repetitive requests using technologies such as Cookie change and Javascript, e.g., restriction on http_referer for anti-leech, restriction on http_user_agent for anti-crawler, restriction on request_method for method, and restriction on http_cookie for forbidding visitors which do not carry correct cookies.

2. Restrictions at an application layer: actively controlling access behavior through programs, e.g.

(1) Restriction on a number of accesses per unit time;
(2) Set a time interval between accesses;
(3) Set block time;
(4) Set a black list and/or white list;

3. Shielding accesses from automatic programs by a reverse Turing test (CAPTCHA, a verification code, etc.). Generally, an open question is set, which can be easily recognized by humans but hardly resolved by a machine. Batch requests from programs are restricted by mandatory requirements of humans to answer questions. Currently, popular tests with verification code include picture recognition, answer to random questions, voice verification, and so on.

4. Verification with short messages (SMS) that a verification code is sent from the service to a user's mobile phone and the user is required to enter the verification code prior to completing a request.

Many deficiencies are present in the above methods, and are analyzed hereinafter briefly:

Restrictions on access frequencies implemented at a network layer can be easily bypassed, and meanwhile have a very high rate of false blocking. For example, a large number of NAT architectures are present currently and IP addresses of visitors collected at a server are same, it is thus not feasible to implement restrictions based on the access frequency. Restrictions can be easily bypassed using a proxy technology or by forging an http_cookie and an IP address. In addition, control rules need to be configured for actively controlling access through programs, and it is difficult to control validity of rules and to set a suitable black list and/or while list. Inappropriate control rules may reduce usability of service. For example, the usability of service may be reduced to some extent when a number of accesses per unit time is set.

Checking by a verification code is the most common and mature solution at present, and is widely used. However, the validity of a verification code depends on whether a machine can recognize and answer questions effectively. Making a problem to be over difficult results in inconveniences to a user. However, with evolution of machine intelligence, problems with low difficulty cannot prevent a machine from automatic recognition effectively. Progress of OCR technology reduces effectiveness of a kind of tests based on image recognition for distorted characters. Progress of machine intelligence reduces reliability of tests for automatic answering questions by a machine. In addition, a verification code lowers users' experience, and causes great inconveniences to color-blind or elderly people.

SMS-based authentication has very high reliability, and however has many restrictions, which requires a user to bind his/her mobile phone and may result in additional cost for sending messages and cumbersome user's operations.

CONTENTS OF INVENTION

In view of this, the present invention provides a method and apparatus for restricting batch requests for a service, facilitating restriction on requesting the service in batch and contributing to overcome some deficiencies in the prior art.

In order to achieve the above object, according to an aspect of the present invention, A method of restricting batch requests for service is provided.

The method for restricting batch requests for service of the invention comprises: receiving, by a server, service requests information sent by a terminal; sending, by the server, a calculation question to the terminal, the calculation question requiring a larger amount of computing recourses of the terminal than that of the server; receiving, by the server, a calculation result of the calculation question from the terminal, and verifying the calculation result, if the calculation result is correct, providing the service to the terminal, otherwise, rejecting to provide the service to the terminal.

Optionally, the calculation question includes a calculation question for consuming memory of the terminal.

Optionally, the server sends data of a plurality of data slices in the memory of the server to the terminal before sending the calculation question to the terminal. The calculation question includes requiring the terminal to provide data in a specified data slice of the plurality of data slices.

Optionally, the calculation question includes a calculation question for consuming network resources of the terminal.

Optionally, the server saves a plurality of network addresses, each of which maintains a file, and saves a digital digest value of the file from the plurality of network addresses before sending the calculation question to the terminal. The calculation question includes requiring the terminal to provide the digital digest value of a file from a specified network address in the plurality of network addresses.

According to another aspect of the present invention, an apparatus for restricting batch requests for a service is provided.

The apparatus for restricting batch requests for service of the invention comprises: a receiving module for receiving service requests information sent by a terminal; a questioning module for sending a calculation question to the terminal, the calculation question requiring a larger amount of computing recourses of the terminal than that of the server; a response verification module for receiving a calculation result of the calculation question from the terminal, and verifying the calculation result, if the calculation result is correct, returning information indicating that the verification is passed to the terminal, otherwise, returning information indicating that the verification is not passed to the terminal.

Optionally, the calculation question includes a calculation question for consuming memory of the terminal.

Optionally, the apparatus further comprises a memory data transmission module for transmitting data of a plurality of data slices in the memory of the server to the terminal. The calculation question includes requiring the terminal to provide data in a specified data slice of the plurality of data slices.

Optionally, the calculation question includes a calculation question for consuming network resources of the terminal.

Optionally, the apparatus further comprises a network address saving module for saving a plurality of network addresses, each of which maintains a file, and for saving a digital digest value of the file from the plurality of network addresses. The calculation question includes requiring the terminal to provide the digital digest value of a file from a specified network address in the plurality of network addresses.

According to the technical solution of the invention, a server providing a service raises a calculation question to a terminal requesting the service. The computing resources required by the calculation question are asymmetric for the server and the terminal. It's necessary for the terminal to resolve the question before further obtaining the service according to the method, wherein the restriction cannot be bypassed. Not too much computing resources would be consumed for a legitimate terminal which merely requests service for one time or several times, such that availability of the service will not be reduced. On the contrary, computing resources would be efficiently consumed for a terminal which uses a program to make malicious batch requests such that it is difficult for the terminal to continue requesting.

In addition, the present technical solution also avoids limitations of checking or authentication a terminal with a verification code, SMS etc. in the prior art.

DESCRIPTION OF DRAWINGS

Figures are used for better understanding of the present invention, and do not constitute improper limitations to the present invention.

EMBODIMENTS

Figure 1:
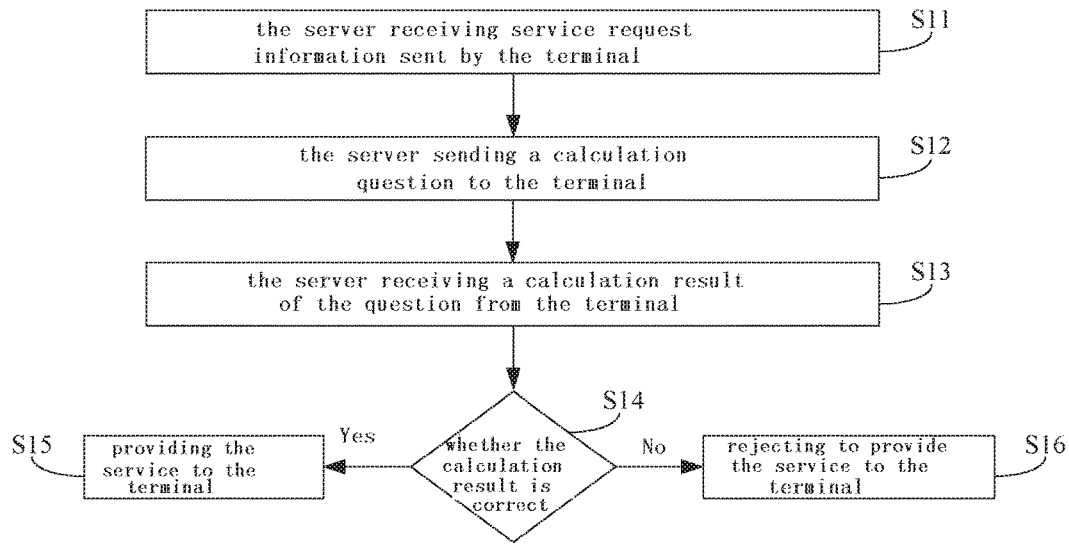
FIG. 1 is a schematic diagram of major steps of a method for restricting batch requests for service according to an embodiment of the present invention.

Exemplary examples of the present invention will be described below with reference to the accompanying drawings, wherein various details of examples of the invention are included to facilitate understanding and should be construed to be merely exemplary. Accordingly, the person skilled in the art should be aware that various changes and modifications may be made to the embodiments described herein without departing from the scope and spirit of the invention. Also, for the sake of clarity and conciseness, descriptions of known functions and structures are omitted from the following description.

In examples of the present invention, a number of requests executable by an initiator of batch requests per unit time are naturally restricted by increasing resources consumption for a single request from the program of the initiator of batch requests. In the method for restricting batch requests for service of the present embodiment, a service provider raises a question to a service requestor, and a program of the service requestor must consume computing resources (CPU, memory, network resource, etc.) to solve the question. It would be preferred that the difficulty of the question is designed within a reasonable range, such that resources consumption at a client is controlled in an acceptable range respecting to a computing scale of a discrete single normal user, while it is difficult to carry out batch requests because the demand for resources is increased by several times, in particular parallel batch requests. The computing resources required by the designed question are asymmetric for a requestor (a party that solves the question) and a server (a party that performs checking), wherein the resources consumption for checking is little so as not to reduce the performance of the server. The above asymmetric questions can be designed based on asymmetry algorithm (such as large number factorization) or asymmetry of information (for example, the service requestor is required to download and calculate a digest value of a file which is known to the service provider).

Taken user registration in batch as an example, a malicious registration program can easily execute 256 batches of processing threads in parallel on a personal computer in general configuration, each thread consuming 1M memory, each registration consuming 8K bytes of network traffic flow, each thread registering one new user in one second and correspondingly registering 256×60=15360 new users in one minute. The resources consumption is 256×1M of memory and 256×8K=2M bytes of traffic flow, respectively.

With this method, the service provider requires the requestor to solve a question for each registration, and the required resources consumption is calculated to be a 100% of CPU load for 2 seconds, 1 G of memory, and 1M bytes of network traffic flow. As regarding to the above example, if an attacker still initiates 256 threads, only 30 users can be registered successfully at most in one minute, and resources consumption is 100% of CPU load, 256G of memory, and 256M bytes of network traffic flow, respectively.

FIG. 1 is a schematic diagram of major steps of a method of restricting batch requests for service according to an embodiment of the present invention. The method is performed by a server maintained by the service provider described above.

Step S11: The server receives service request information sent by a terminal. The terminal herein is the client software used by the user. The service request information may be sent by a normal user or a malicious user.

Step S12: The server sends a calculation question to the terminal. As described above, the calculation question requires a larger amount of computing recourses of the terminal than that of the server to realize appropriate consumption of the computing resources of the terminal.

Step S13: The server receives the calculation result of the question from the terminal.

Step S14: The server verifies whether the received calculation result is correct. If it is correct, the process proceeds to step S15 in which the service is provided to the terminal. Otherwise, the process proceeds to step S16, and providing the service to the terminal is rejected. Obviously, a corresponding prompt information will be sent to the terminal, no matter whether the result is correct.

In order to ensure asymmetry of recourses requirement for the question solving and checking, a verification question needs to be carefully designed, which is described from three aspects of resource requirements.

CPU computing resource consumption: there are various asymmetric algorithms, such as large number factorization that the calculation complexity for the question solving can be controlled by a digit number of a target number. Requirements for computing resources are asymmetric for the question solving and checking, and the cost for checking is quite low (a limited number of multiplication operations are executed). In an actual system, several algorithms can be used alternately for further increasing security.

Memory resource consumption: asymmetry of resources requirement can be achieved based on information asymmetry by the following method: only one data slice needs to be selected as a question randomly, as well as only this data slice needs to be saved (and even only the digest of this data slice needs to be saved) for the service provider; while all of data slices need to be saved for the service requestor without the knowledge of data content from which data slice the service provider requiring to be answered. In this way, the server can send different data slices in the memory thereof to the terminal for several times, and then content of the question raised to the terminal can be "what is the data from the X slice", wherein X represents a specified slice. It can be seen that resource consumptions of memory is asymmetric for the server and the terminal requesting the service with the present method.

Network resource consumption: a database can be established, in which a series of links to public files in the Internet are stored, and the digital digest value of each file is calculated in advance and saved. The service provider selects a file randomly during verification, and the service requestor is required to download the file and calculate its digital digest value to pass the verification.

Figure 2:
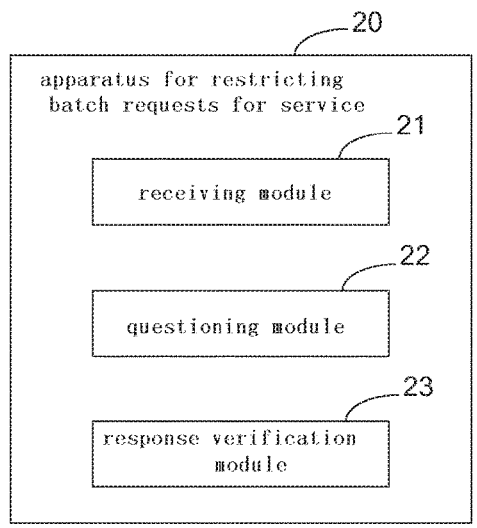
FIG. 2 is a schematic diagram of main modules of an apparatus for restricting batch requests for service according to an embodiment of the present invention.

FIG. 2 is a schematic diagram of main modules of an apparatus for restricting batch requests for service according to an embodiment of the present invention. The apparatus, as a computer software, can be arranged in the above server device. As shown in FIG. 2, the apparatus for restricting batch requests for service 20 mainly comprises: a receiving module 21, questioning module 22 and a response verification module 23. The receiving module 21 is used for receiving service request information sent by a terminal; the questioning module 22 is used for sending a calculation question to the terminal, the calculation question requiring a larger amount of computing recourses of the terminal than that of the server; and the response verification module 23 is used for receiving a calculation result of the question from the terminal, and verifying the result, if the calculation result is correct, returning information indicating that the verification is passed to the terminal, otherwise, returning information indicating that the verification is not passed to the terminal.

The calculation question can include a calculation question for consuming memory of the terminal. In such way, the apparatus 20 further comprises a memory data transmitting module for transmitting data of a plurality of data slices in a memory of the server device to the terminal. The calculation question can include requiring the terminal to provide data in a specified data slice of the plurality of data slices.

The computing question can include a calculation question for consuming network resources of the terminal. In such way, the apparatus 20 further comprises a network address saving module for saving a plurality of network addresses, each of which maintains a file, and for saving a digital digest value of the file from the plurality of network addresses. The calculation question can include requiring the terminal to provide the digital digest value of a file from a specified network address in the plurality of network addresses.

According to the technical solution of the invention, a server providing a service raises a calculation question to a terminal requesting the service. The computing resources required by the calculation question are asymmetric for the server and the terminal. It's necessary for the terminal to resolve the question before further obtaining the service according to the method, wherein the restriction cannot be bypassed. Not too much computing resources would be consumed for a legitimate terminal which merely requests service for one time or several times, such that availability of the service will not be reduced. On the contrary, computing resources would be efficiently consumed for a terminal which uses a program to make malicious batch requests such that it is difficult for the terminal to continue requesting. In addition, the present technical solution also avoids limitations of checking or authenticating a terminal with a verification code, SMS etc. in the prior art.

The basic principle of the present invention has been described above combining specific embodiments. In the apparatus and method of the present invention, it is obvious that respective components or steps can be decomposed and/or recombined. These decompositions and/or recombinations should be considered as equivalent solutions of the present invention. Moreover, the steps of executing the above series of process can be naturally performed in the described order in time sequence, but does not need to be performed in time sequence necessarily. Some steps may be performed in parallel or independently of each other.

The above embodiments do not constitute limitations to the scope of protection of the invention. It should be understood by those skilled in the art that various modifications, combinations, sub-combinations and substitutions may occur depending on design requirements and other factors. Any modifications, equivalent substitutions and improvements within the spirit and principle of the invention should be included within the scope of protection of the present invention.

The invention claimed is:

1. A method for restricting batch requests for a service, characterized in comprising:
receiving, by a server, service request information sent by a terminal;
sending, by the server, a calculation question to the terminal, the calculation question requiring a larger amount of computing resources of the terminal than that of the server; and
receiving, by the server, a calculation result of the calculation question from the terminal, and verifying the calculation result, and if the calculation result is correct, providing the service to the terminal, otherwise, rejecting to provide the service to the terminal.

2. The method according to claim 1, characterized in that the calculation question includes a calculation question for consuming memory of the terminal.

3. The method according to claim 2, characterized in further comprising:
sending, by the server, data of a plurality of data slices in the memory of the server to the terminal before the server sends the calculation question to the terminal; and
the calculation question including requiring the terminal to provide data in a specified data slice of the plurality of data slices.

4. The method according to claim 1, characterized in that the calculation question includes a calculation question for consuming network resources of the terminal.

5. The method according to claim 4, characterized in further comprising:
saving a plurality of network addresses, each of which maintains a file, and saving a digital digest value of the file from a plurality of network addresses before the server sends the calculation question to the terminal; and
the calculation question including requiring the terminal to provide the digital digest value of a file from a specified network address in the plurality of network addresses.

* * * * *